United States Patent
Cherif et al.

(10) Patent No.: US 9,351,004 B2
(45) Date of Patent: May 24, 2016

(54) MULTIVIEW VIDEO CODING REFERENCE PICTURE SELECTION UNDER A ONE REFERENCE PICTURE CONSTRAINT

(75) Inventors: Mohamed K. Cherif, Toronto (CA); Lei Zhang, Richmond Hill (CA); Baochun Li, Toronto (CA); Syed Y. Ali, Richmond Hill (CA); Jiao Wang, Richmond Hill (CA)

(73) Assignee: ATI TECHNOLOGIES ULC, Markham, Ontario (CA)

( * ) Notice: Subject to any disclaimer, the term of this patent is extended or adjusted under 35 U.S.C. 154(b) by 1091 days.

(21) Appl. No.: 13/436,091

(22) Filed: Mar. 30, 2012

(65) Prior Publication Data

US 2013/0163670 A1 Jun. 27, 2013

Related U.S. Application Data

(60) Provisional application No. 61/580,424, filed on Dec. 27, 2011.

(51) Int. Cl.
| | | |
|---|---|---|
| *H04N 7/32* | (2006.01) | |
| *H04N 19/132* | (2014.01) | |
| *H04N 19/597* | (2014.01) | |
| *H04N 19/105* | (2014.01) | |
| *H04N 19/159* | (2014.01) | |
| *H04N 19/176* | (2014.01) | |
| *H04N 19/172* | (2014.01) | |

(52) U.S. Cl.
CPC ........... *H04N 19/132* (2014.11); *H04N 19/105* (2014.11); *H04N 19/159* (2014.11); *H04N 19/172* (2014.11); *H04N 19/176* (2014.11); *H04N 19/597* (2014.11)

(58) Field of Classification Search
CPC . H04N 19/105; H04N 10/142; H04N 19/103; H04N 19/159; H04N 19/172; H04N 19/176
USPC ..................................................... 375/240.16
See application file for complete search history.

(56) References Cited

U.S. PATENT DOCUMENTS

| | | | |
|---|---|---|---|
| 2007/0171972 A1* | 7/2007 | Tian et al. ................. | 375/240.12 |
| 2010/0020871 A1* | 1/2010 | Hannuksela et al. .... | 375/240.12 |
| 2011/0063409 A1* | 3/2011 | Hannuksela ..................... | 348/42 |
| 2012/0014442 A1* | 1/2012 | Takahashi et al. ........ | 375/240.12 |
| 2013/0148940 A1* | 6/2013 | Schmit et al. .................. | 386/230 |

OTHER PUBLICATIONS

ITU-T H.264 "Telecommunication Standardization Sector of ITU," Series H: Audiovisual and Multimedia Systems, Infrastructure of audiovisual services—Coding of moving video "Advanced video coding for generic audiovisual services" Annex H, Multiview video coding, pp. 604-657, Geneva, Jan. 2012 (57 pages).

* cited by examiner

*Primary Examiner* — William C Vaughn, Jr.
*Assistant Examiner* — Naod Belai
(74) *Attorney, Agent, or Firm* — Volpe and Koenig, P.C.

(57) ABSTRACT

A method for coding a dependent view picture based on a reference picture includes selecting a reference picture from a base view picture list if a metric of intra macroblocks in an evaluated picture is greater than a first threshold, selecting a reference picture from a dependent view picture list if a metric of skipped macroblocks in the evaluated picture is greater than a second threshold, and coding a dependent view picture using the selected reference picture. An application-controlled weighting mechanism may be used if both of the thresholds are not met.

22 Claims, 4 Drawing Sheets

MULTIVIEW VIDEO CODING REFERENCE PICTURE SELECTION UNDER A ONE REFERENCE PICTURE CONSTRAINT

FIELD OF THE INVENTION

The present invention is generally directed to video coding, and in particular, to reference picture selection in multiview video coding.

BACKGROUND

In video coding, there are two types of macroblocks that are used: intra macroblocks, which do not need information from previous pictures to be coded, but may use some neighboring macroblocks for coding; and inter macroblocks, which use information from previous or future pictures for coding.

In steroscopic video encoding, there are two views, commonly referred to as the left eye view and the right eye view. With a three dimensional (3D) video, there are two frames encoded—one for each eye. The encoding of these two views assumes that there are two reference views to predict subsequent pictures from, since both views describe the same scene.

For example, the right eye view may be the base view (which is a self-decodable layer) and the left eye view is the dependent view (it is dependent on the right eye view) and needs the base view for optimal coding efficiency. When the dependent view predicts its own pictures, it references the base view since it can remove more redundancies because of the similarities between the views.

Some existing hardware implementations can only support one reference picture for encoding. Coding the base view based on the reference picture does not present any problems. But coding the dependent view presents a choice between using pictures in the dependent layer or coding blindly from pictures in the base layer. For example, when coding the left eye view, there is a choice between coding the left eye dependent view from pictures in the left eye stream or pictures from the right eye stream (because the right eye stream is essentially the same picture as the left eye stream, but shifted or from a different angle, for example).

In a MultiView Coding (MVC) system, the dependent view should be coded using both the base view and the dependent view reference pictures (both paths are allowed and are needed for optimal encoding). In a system where prediction is constrained to use only one reference picture due to hardware throughput or memory bandwidth limitations, there is no mechanism for optimal reference picture selection to be used for encoding the dependent views. This is the case for the left eye view or the right eye view (whichever is the dependent view), but is also generic for multiviews where each layer predicts from the base layer above it.

For the dependent view, there are two existing approaches to address the single reference picture prediction constraint. A first, intuitive solution would be to use two encoding passes: one pass to evaluate the prediction from the base view, and a second pass to evaluate the cost of the prediction from the same view. The two pass approach requires additional time, and is not ideal for real-time encoding. A second solution would be to use blind prediction from only one of the two views (i.e., a one-pass only approach), but this solution is sub-optimal for compression performance.

SUMMARY OF EMBODIMENTS

A method for coding a dependent view picture based on a reference picture includes selecting a reference picture from a base view picture list if a metric of intra macroblocks in an evaluated picture is greater than a first threshold, selecting a reference picture from a dependent view picture list if a metric of skipped macroblocks in the evaluated picture is greater than a second threshold, and coding a dependent view picture using the selected reference picture.

A system for coding a dependent view picture based on a reference picture includes a memory and a processor. The memory is configured to store a base view picture list and a dependent view picture list. The processor is in communication with the memory, and is configured to select a reference picture from the base view picture list if a metric of intra macroblocks in an evaluated picture is greater than a first threshold, select a reference picture from the dependent view picture list if a metric of skipped macroblocks in the evaluated picture is greater than a second threshold, and code a dependent view picture using the selected reference picture.

A computer-readable storage medium storing a set of instructions for execution by a general purpose computer to code a dependent view picture based on a reference picture includes a first selecting code segment, a second selecting code segment, and a coding code segment. The first selecting code segment selects a reference picture from a base view picture list if a metric of intra macroblocks in an evaluated picture is greater than a first threshold. The second selecting code segment selects a reference picture from a dependent view picture list if a metric of skipped macroblocks in the evaluated picture is greater than a second threshold. The coding code segment codes a dependent view picture using the selected reference picture.

BRIEF DESCRIPTION OF THE DRAWINGS

A more detailed understanding may be had from the following description, given by way of example in conjunction with the accompanying drawings wherein.

DETAILED DESCRIPTION

A method and system for coding a dependent view picture based on a reference picture are described. The method, which may be performed by a processor, begins by evaluating a base view picture. The reference picture is selected from a base view picture list if a percentage (e.g., a metric) of intra macroblocks in the evaluated picture is greater than a first threshold. The reference picture is selected from a dependent view picture list if a percentage of skipped macroblocks in the evaluated picture is greater than a second threshold. The dependent view picture is then coded using the selected reference picture. The first threshold and the second threshold may be dynamically adjusted, based on coded base and dependent view picture statistics. If the percentage (e.g., a metric) of intra macroblocks in the evaluated picture is less than the first threshold and the percentage of skipped macroblocks in the evaluated picture is less than the second threshold, then weights are applied to the base view picture and the dependent view picture, and the reference picture is selected from the base view picture list or the dependent view picture list based on the weighting.

Figure 1:
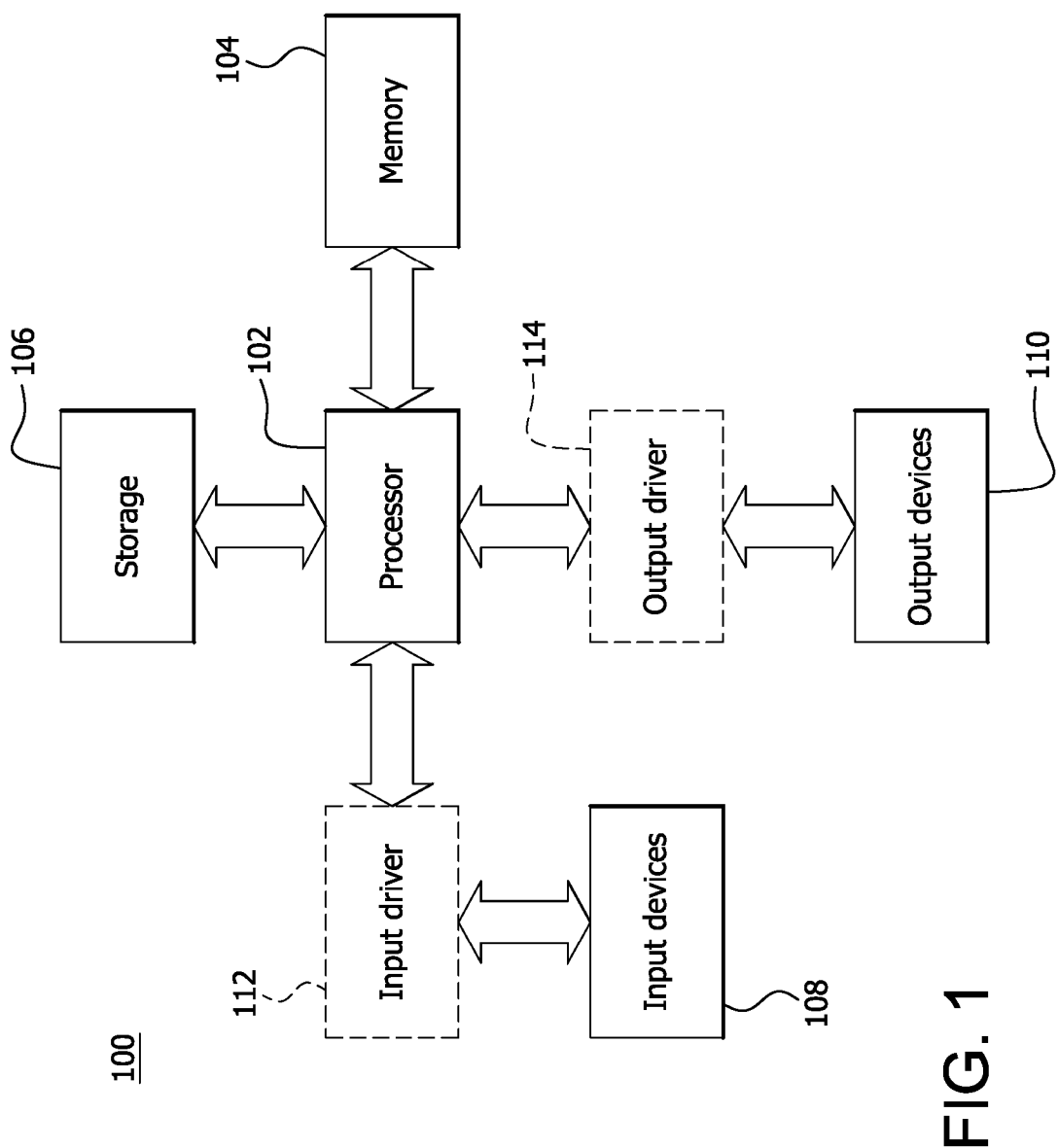
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner is the input driver 112 and the output driver 114 are not present.

A picture selection algorithm is defined which yields an optimal reference picture used for prediction, but with a single pass, by using the statistics of the base view encoder.

If the encoder is trying to compress the dependent view and there is a complete scene change, then a match will not be found in the dependent view reference list because of the scene change. If there is a scene change, then a prediction from the base view is optimal (i.e., the right eye predicting from the left eye, with the left eye being the base view), because the base view has already coded the scene change. In this instance, there will be a high redundancy between the dependent view and the currently encoded base view. Therefore, the base view should be used for prediction to minimize the bitstream size under a motion-compensated prediction scenario. Using the dependent view as the reference picture would not find a good picture match that minimizes the prediction distortion.

If there is not much change in the picture from the previous temporal instance (referred to as a static picture for simplification), then predicting from the same view is optimal (i.e., the current picture of the right eye is predicted from the previous picture of the right eye). Because there is a high degree of similarity between successive pictures from the same view, the dependent view may be used as the reference picture for coding the next dependent view picture. Using the dependent view as the reference picture can save processing time by not accessing the base view, because the two views are almost the same. In addition, using the dependent view as the reference picture is more efficient coding-wise, because there are no bits used beyond those used for the "skipped" syntax at the macroblock, slice, or picture layers.

Figure 2:
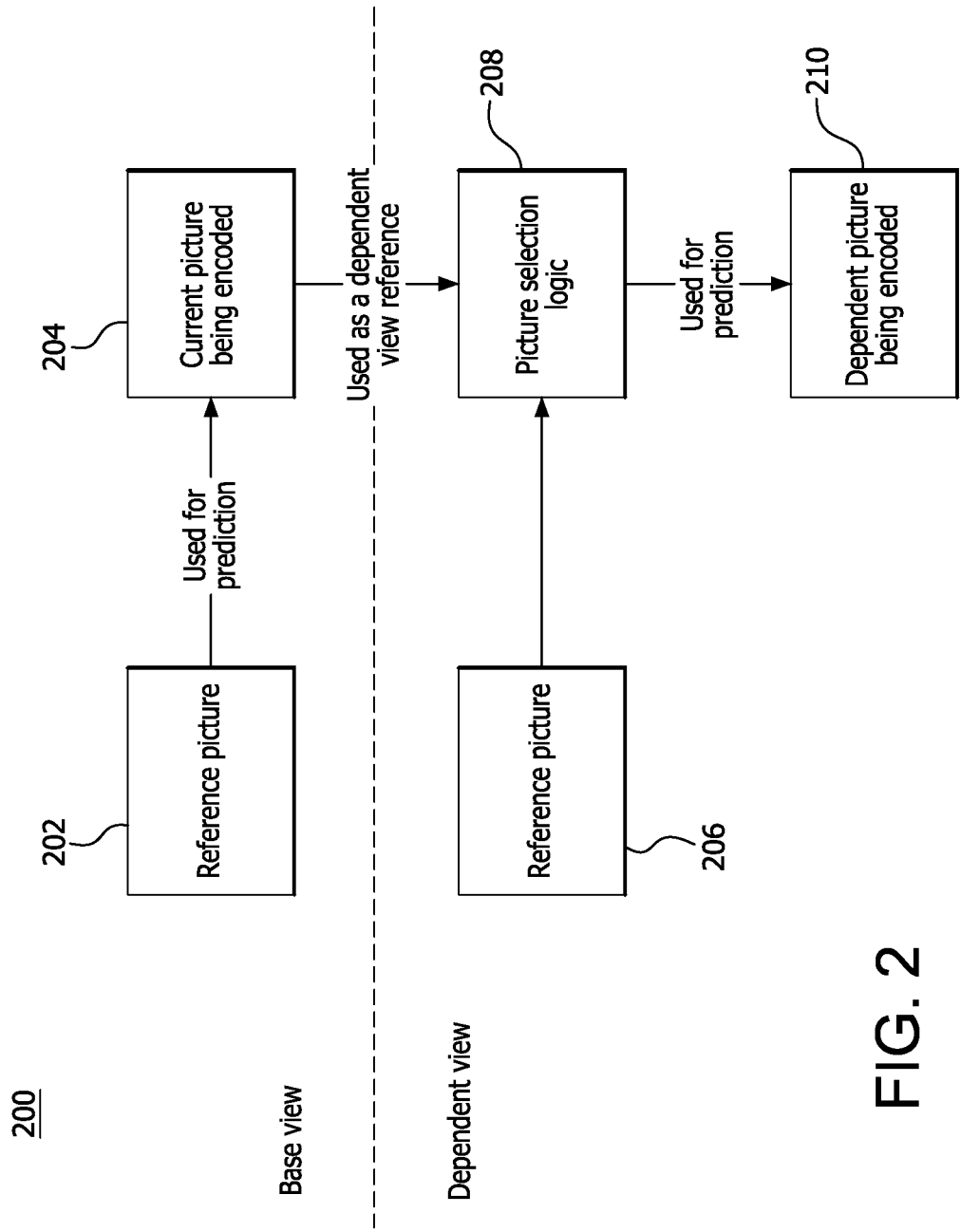
FIG. 2 is a diagram of a prediction structure with one reference picture.

FIG. 2 is a diagram of a prediction structure 200 with one reference picture. A base view reference picture 202 is used to predict a current picture being encoded 204, which may be used as a dependent view reference picture. A dependent view reference picture 206 and the current picture 204 are supplied to picture selection logic 208. The picture selection logic 208 determines whether the current picture 204 (derived from the base view reference picture 202) or the dependent view reference picture 206 should be used as a reference to predict a dependent picture being encoded 210.

Figure 3:
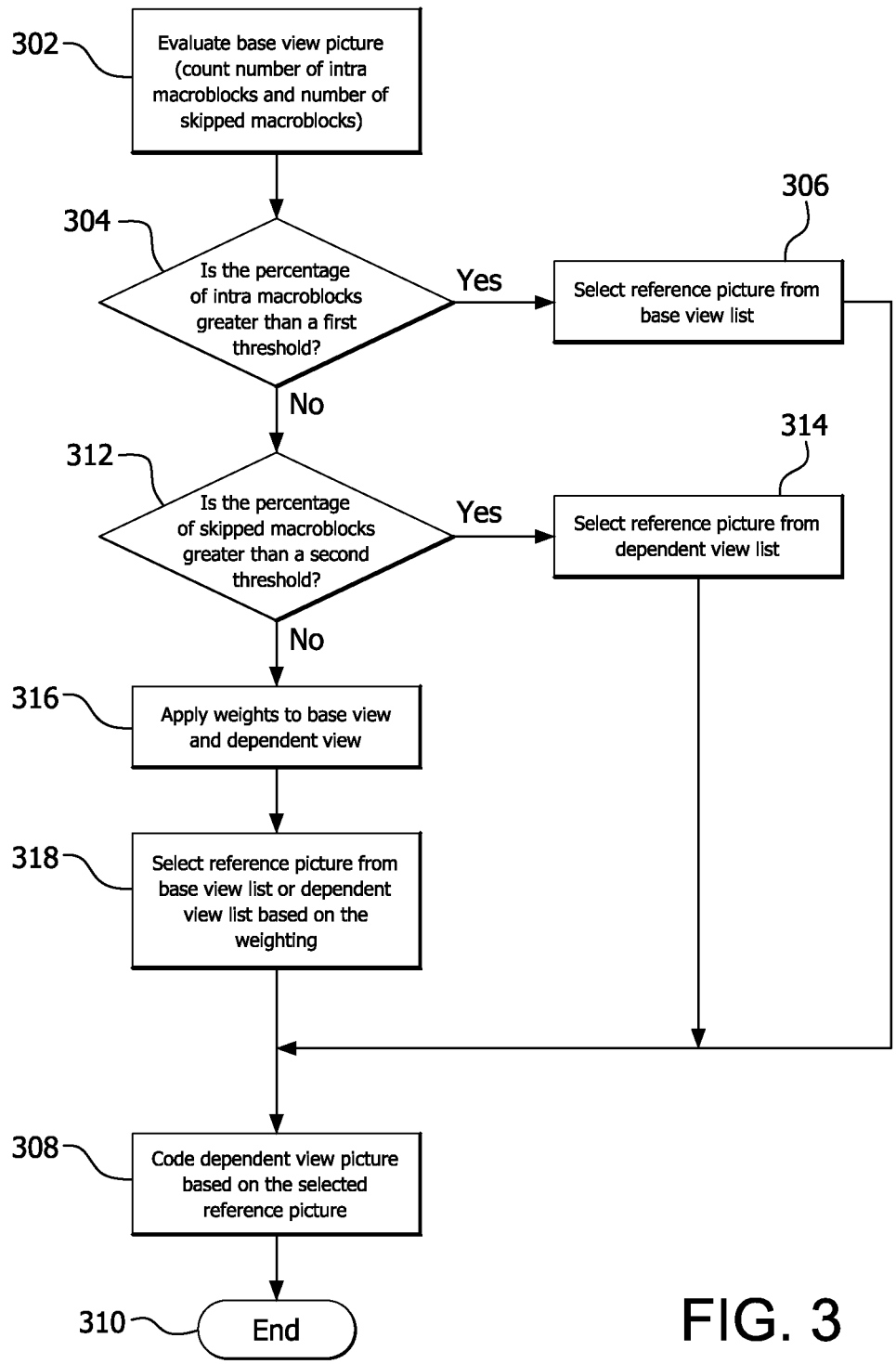
FIG. 3 is a flowchart of a method for implementing picture selection logic when using one reference picture.

FIG. 3 is a flowchart of a method 300 for implementing the picture selection logic 208 when using one reference picture. When the dependent view is coded, the base view has already been encoded. Statistics from the base view may be used when coding the dependent view.

A base view picture is evaluated by counting the number of intra macroblocks and the number of skipped macroblocks in the picture (step 302). A determination is made whether the percentage of intra macroblocks in the picture is greater than a first threshold (step 304). If the percentage of intra macroblocks in the picture is greater than the first threshold, then the reference picture for the dependent view is selected from the base view list (step 306). The dependent view picture is coded based on the selected reference picture (step 308) and the method terminates (step 310). As will be appreciated, the percentage value(s) used in steps 304 and 306 are only one type of metric that could be used. Counts, ratios, averages over a period of time (or over a groups of pictures), or other metrics could also be employed alternatively or in conjunction with the percentage value(s).

If the current base view picture contains a high percentage of intra macroblocks (more than the first threshold), then there is no match in the previous picture (indicative of a scene change), and the base view should be used as the reference picture for coding the dependent view. In one implementation, the percentage of intra macroblocks may be between 10-15%; if the percentage of intra macroblocks is much higher than this threshold, then it is an indication of a scene change. It is noted that the 10-15% range is exemplary, and may be based on a statistical assessment of each encoder's implementation and is tied to the rate-distortion tradeoffs made. For example, some encoders may use higher levels of intra macroblocks to bypass motion estimation and save time. For those encoders, the 10-15% range would need to be adjusted appropriately; otherwise, there would be too many scene change detections. Conversely, if there is no scene change, the percentage of intra macroblocks should be relatively low.

In this case, it would be optimal to predict the dependent view from the base view, because there is content which just entered the scene and it would not have a good match in the dependent reference picture. The threshold may be initialized with a static value and be updated based on a statistical averaging of the intra macroblock rate from a representative set of pictures for each particular application.

If the percentage of intra macroblocks in the picture is not greater than the first threshold (step 304), then a determination is made whether the percentage of skipped macroblocks in the picture is greater than a second threshold (step 312). If the percentage of skipped macroblocks in the picture is greater than the second threshold, then the reference picture is selected from the dependent view list (step 314). The dependent view picture is coded based on the selected reference picture (step 308) and the method terminates (step 310).

During coding of a picture, a macroblock is skipped if there is no change (or minimal change) from the previous picture. When the number of skipped macroblocks in the base view exceeds a certain threshold, it is an indication of a static picture, and a minimum amount of distortion is expected when predicting from the same layer (the dependent view). In this case, the dependent view may be used to generate the next dependent view picture. The threshold may be initialized in a similar manner (based on a statistical assessment of the number of skipped macroblocks under conditions of background/non-moving objects as a training sequence) and may be updated by integrating the picture statistics through macroblock activity and the average number of skipped macroblocks.

If the percentage of skipped macroblocks in the picture is not greater than the second threshold (step 312), then weights are applied to the base view and the dependent view (step 316). The reference picture is selected from the base view list or the dependent view list based on the weighting (step 318). The dependent view picture is coded based on the selected reference picture (step 308) and the method terminates (step 310).

There may be in-between cases where neither the number of the intra macroblocks (step 304) nor the skipped number of macroblocks (step 312) exceed a conclusive threshold as to what prediction layer to use. In these cases, there will be a similar prediction cost in using either layer (base or dependent) for coding the new picture. Both prediction layers may be weighted to assist in the selection. The weighting may be biased by the application. For example, if there is a requirement for speed, the skipped mode may be favored, as it uses fewer cycles and fewer bits, because it codes fewer coefficients. But the skipped mode also comes with a cost of sacrificing a measured amount of detail.

In one implementation, the weighting may be based on the number and length of the motion vectors associated with the base view and the dependent view, correlated with the amount of residual coefficients to encode. If there are several motion vectors with long enough displacements (e.g., more than a few pixels), this is an indication that the picture being coded is not too similar to the previous picture, and the base view may be used for prediction. If there are no significant motion vectors (which may be threshold-based), then the dependent view may be used for prediction.

It is noted that the assessment of the percentage of intra macroblocks (step 304) and the percentage of skipped macroblocks (step 312) may be performed at the same time or in any order. Also, there will not be a case where both the percentage of intra macroblocks and the percentage of skipped macroblocks exceed their respective thresholds, because there cannot be a scene change and a static picture at the same time.

By using the statistics from the base view pictures or from the dependent view pictures, the thresholds may be dynamically adjusted. The thresholds should evolve with the picture statistics, so as to reflect content with high detail or macroblock activity inherent to the scene. The exception to this rule is when there is a key picture instantaneous decoding refresh frame/I slice (IDR/I), where all macroblocks are coded using intra prediction.

Figure 4:
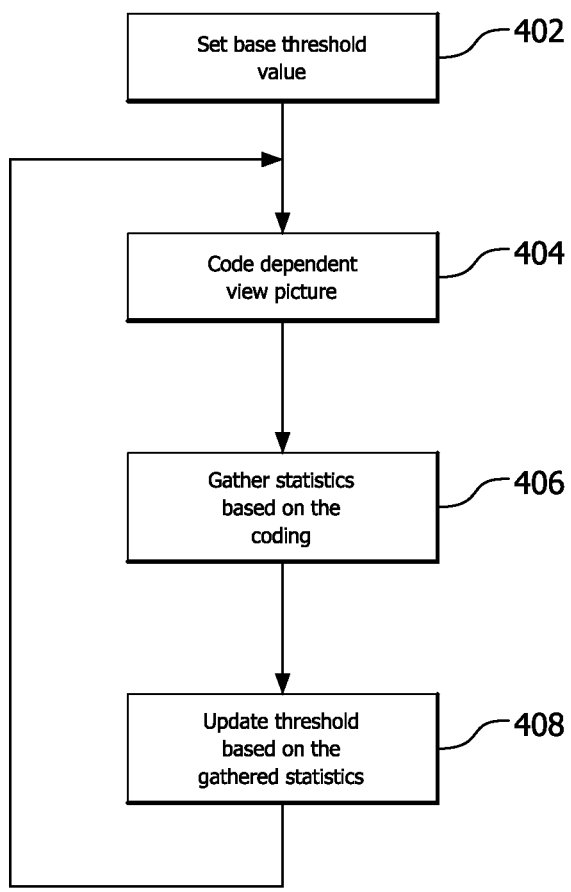
FIG. 4 is a flowchart of a method for updating thresholds used by the picture selection logic.

FIG. 4 is a flowchart of a method 400 for updating thresholds used by the picture selection logic. The base threshold values are set for the percentage of intra macroblocks and the percentage of skipped macroblocks (step 402). Dependent view pictures are coded (step 404), and statistics regarding the number of intra macroblocks and the number of skipped macroblocks in the dependent view pictures are gathered (step 406). The thresholds may then be updated based on the gathered statistics (step 408).

As a further refinement to the statistical data collection, each picture may be split into partitions or areas such as, for example, top, bottom, left, center, and right, and adaptively switch macroblock prediction for each of these areas according to the mechanism described above, as it may help in cases like letter boxing and heavily-concentrated motion areas.

The picture selection logic may be extended in the same manner to work with multiple dependent views or layers (instead of the two layers described above), where each layer references or points to the layer below it. The picture selection logic provides several advantages over the existing solutions. For two views (i.e., stereoscopic encoding), this method only uses half of the memory bandwidth, compared to the existing two pass approach, because only one memory fetch is needed instead of two, which is beneficial for low-end systems where memory bandwidth is critical. In some systems, there may be up to a 2× throughput gain, compared to the two pass approach, because only one set of motion searches is needed on one reference. In true multiview encoding (i.e., more than two views), the benefit of memory bandwidth reduction and throughput gain associated with this method may be more pronounced.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for coding a dependent view picture based on a reference picture, comprising:
    coding a base view picture;
    evaluating the coded base view picture by determining (i) a metric of intra macroblocks used during the coding of the base view picture and (ii) a metric of skipped macroblocks omitted during the coding of the base view picture;

selecting, as the reference picture to code the dependent view picture, the evaluated coded base view picture when the determined metric of intra macroblocks in the evaluated coded base view picture is greater than a first threshold;

selecting, as the reference picture to code the dependent view picture, a dependent view reference picture when the determined metric of skipped macroblocks in the evaluated coded base view picture is greater than a second threshold; and coding the dependent view picture using the selected reference picture.

2. The method according to claim 1, wherein the metric of intra macroblocks is a percentage and the metric of skipped macroblocks is a percentage.

3. The method according to claim 1, wherein the first threshold and the second threshold are initialized based on a statistical assessment of the evaluated coded picture.

4. The method according to claim 1, wherein the first threshold and the second threshold are dynamically adjusted based on coded dependent view picture statistics.

5. The method according to claim 1, wherein if the metric of intra macroblocks in the evaluated picture is less than the first threshold and the metric of skipped macroblocks in the evaluated picture is less than the second threshold, the method further comprising:

applying weights to the base view picture and the dependent view picture; and selecting a reference picture from the base view picture list or the dependent view picture list based on the weighting.

6. The method according to claim 5, wherein the weights are based on a number and length of motion vectors associated with the base view picture and a number and length of motion vectors associated with the dependent view picture, correlated with an amount of residual coefficients to encode.

7. The method according to claim 1, further comprising:

storing the coded dependent view picture in a non-transitory computer readable medium.

8. A system for coding a dependent view picture based on a reference picture, comprising:

a memory configured to store one or more base view pictures and one or more dependent view pictures; and a processor in communication with the memory, the processor configured to:

code a base view picture of the stored one or more base view pictures;

evaluate the coded base view picture by determining (i) a metric of intra macroblocks used during the coding of the base view picture and (ii) a metric of skipped macroblocks omitted during the coding of the base view picture;

select, as the reference picture to code the dependent view picture, the evaluated coded base view picture when the determined metric of intra macroblocks in the evaluated coded base view picture is greater than a first threshold;

select, as the reference picture to code the dependent view picture, a dependent view reference picture, when the metric of skipped macroblocks in the evaluated coded base view picture is greater than a second threshold; and code the dependent view picture using the selected reference picture.

9. The system according to claim 8, wherein the metric of intra macroblocks is a percentage and the metric of skipped macroblocks is a percentage.

10. The system according to claim 8, wherein the processor is further configured to initialize the first threshold and the second threshold based on a statistical assessment of the evaluated coded picture.

11. The system according to claim 8, wherein the processor is further configured to dynamically adjust the first threshold and the second threshold based on coded dependent view picture statistics.

12. The system according to claim 8, wherein the processor is further configured to:

apply weights to the base view picture and the dependent view picture when the metric of intra macroblocks in the evaluated picture is less than the first threshold and the metric of skipped macroblocks in the evaluated picture is less than the second threshold; and select a reference picture from the base view picture list or the dependent view picture list based on the weighting.

13. The system according to claim 12, wherein the weights are based on a number and length of motion vectors associated with the base view picture and a number and length of motion vectors associated with the dependent view picture, correlated with an amount of residual coefficients to encode.

14. The system according to claim 8, wherein the processor is further configured to store the coded dependent view picture in a non-transitory computer readable medium.

15. A non-transitory computer-readable storage medium storing a set of instructions for execution by a general purpose computer to code a dependent view picture based on a reference picture, the set of instructions comprising:

coding a base view picture evaluating the coded base view picture by determining (i) a metric of intra macroblocks used during the coding of the base view picture and (ii) a metric of skipped macroblocks omitted during the coding of the base view picture;

selecting, as the reference picture to code the dependent view picture, the evaluated coded base view picture when the determined metric of intra macroblocks in the evaluated coded base view picture is greater than a first threshold;

selecting, as the reference picture to code the dependent view picture, a dependent view reference picture when the determined metric of skipped macroblocks in the evaluated coded base view picture is greater than a second threshold; and coding the dependent view picture using the selected reference picture.

16. The non-transitory computer-readable storage medium according to claim 15, wherein the metric is a percentage.

17. The non-transitory computer-readable storage medium according to claim 15, further comprising:

an initializing code segment for initializing the first threshold and the second threshold based on a statistical assessment.

18. The non-transitory computer-readable storage medium according to claim 15, further comprising:

an adjusting code segment for dynamically adjusting the first threshold and the second threshold based on coded dependent view picture statistics.

19. The non-transitory computer-readable storage medium according to claim 15, further comprising:

an applying code segment for applying weights to the base view picture and the dependent view picture, the applying code segment being executed when the metric of intra macroblocks in the evaluated picture is less than the first threshold and the metric of skipped macroblocks in the evaluated picture is less than the second threshold; and a third selecting code segment for selecting a reference picture from the base view picture list or the dependent view picture list based on the weighting.

20. The non-transitory computer-readable storage medium according to claim 19, wherein the applying code segment is further configured to base the weights on a number and length of motion vectors associated with the base view picture and a number and length of motion vectors associated with the dependent view picture, correlated with an amount of residual coefficients to encode.

21. The non-transitory computer-readable storage medium according to claim 15, further comprising:

a storing code segment for storing the coded dependent view picture in a non-transitory computer readable medium.

22. The non-transitory computer-readable storage medium of claim 15, wherein the instructions are hardware description language (HDL) instructions used for the manufacture of a device.

* * * * *